No. 646,751. R. MULHOLLAND. Patented Apr. 3, 1900.
WHEEL FOR VEHICLES.
(Application filed Jan. 9, 1900.)

(No Model.) 3 Sheets—Sheet 1.

Witnesses. Inventor.
L. M. Billings. Richard Mulholland.
G. A. Neubauer. By A. J. Sangster. Attorney.

No. 646,751. Patented Apr. 3, 1900.
R. MULHOLLAND.
WHEEL FOR VEHICLES.
(Application filed Jan. 9, 1900.)
(No Model.) 3 Sheets—Sheet 3.
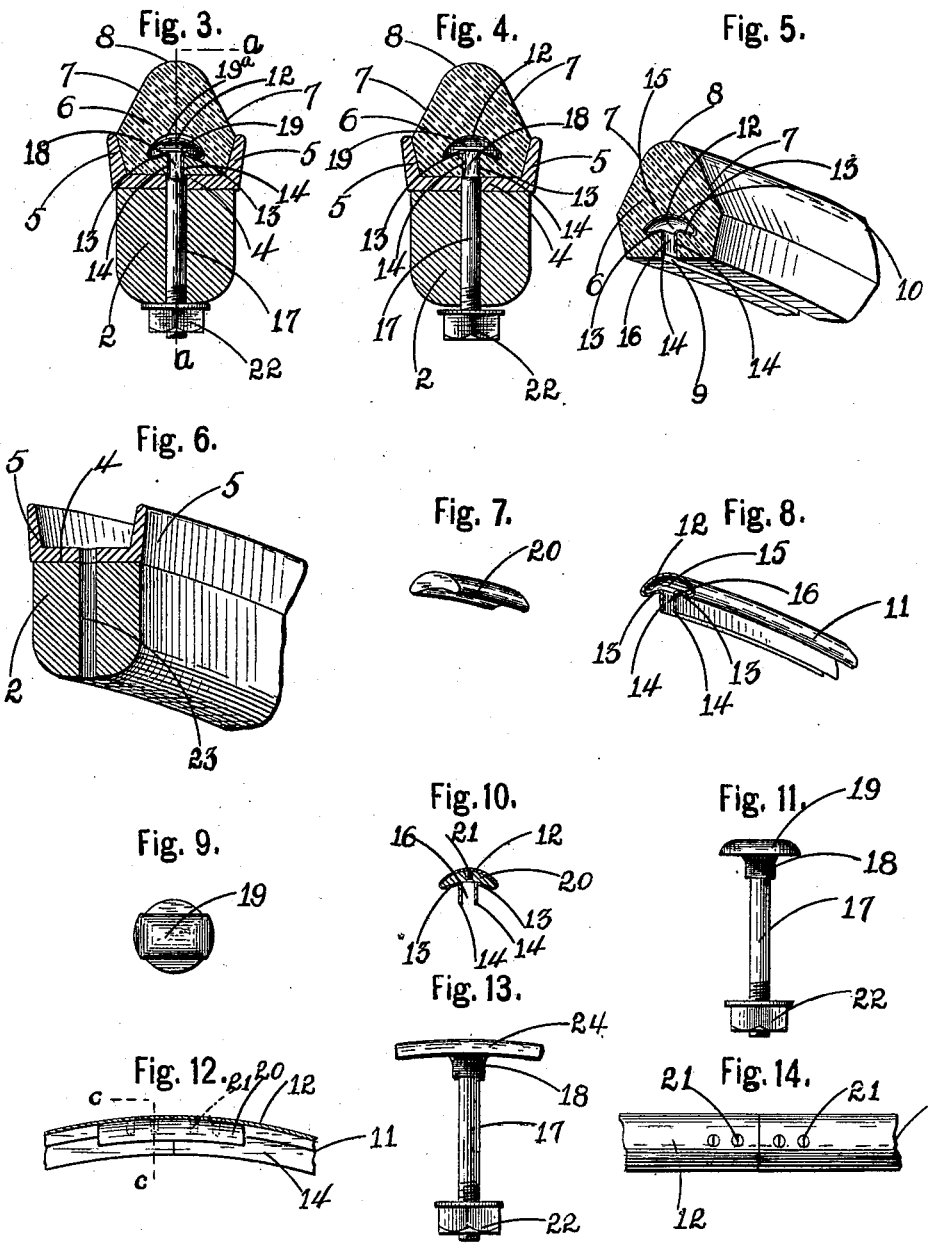
Witnesses. Inventor.
L. M. Billings. Richard Mulholland
Geo. A. Neubauer. By A. P. Sangster. Attorney.

UNITED STATES PATENT OFFICE.

RICHARD MULHOLLAND, OF DUNKIRK, NEW YORK.

WHEEL FOR VEHICLES.

SPECIFICATION forming part of Letters Patent No. 646,751, dated April 3, 1900.

Application filed January 9, 1900. Serial No. 837. (No model.)

*To all whom it may concern:*

Be it known that I, RICHARD MULHOLLAND, a citizen of the United States, residing at Dunkirk, in the county of Chautauqua and State of New York, have invented certain new and useful Improvements in Wheels for Vehicles and the Like, of which the following is a specification.

My invention relates to an improved wheel for vehicles and the like having an elastic tire secured thereto by a locking device that encircles and is supported upon the wheel and has clenching portions extending into the tire; and the object of the invention is to construct a simple, cheap, and easily-assembled wheel of the above class.

For a full understanding of the merits and advantages of the invention reference is to be had to the accompanying drawings and the following description.

The invention is susceptible of various changes in the form, proportion, and minor details of construction without departing from the principle or sacrificing any of the advantages thereof, and to a full disclosure of the invention an adaptation thereof is shown in the accompanying drawings, in which—

Figure 1:
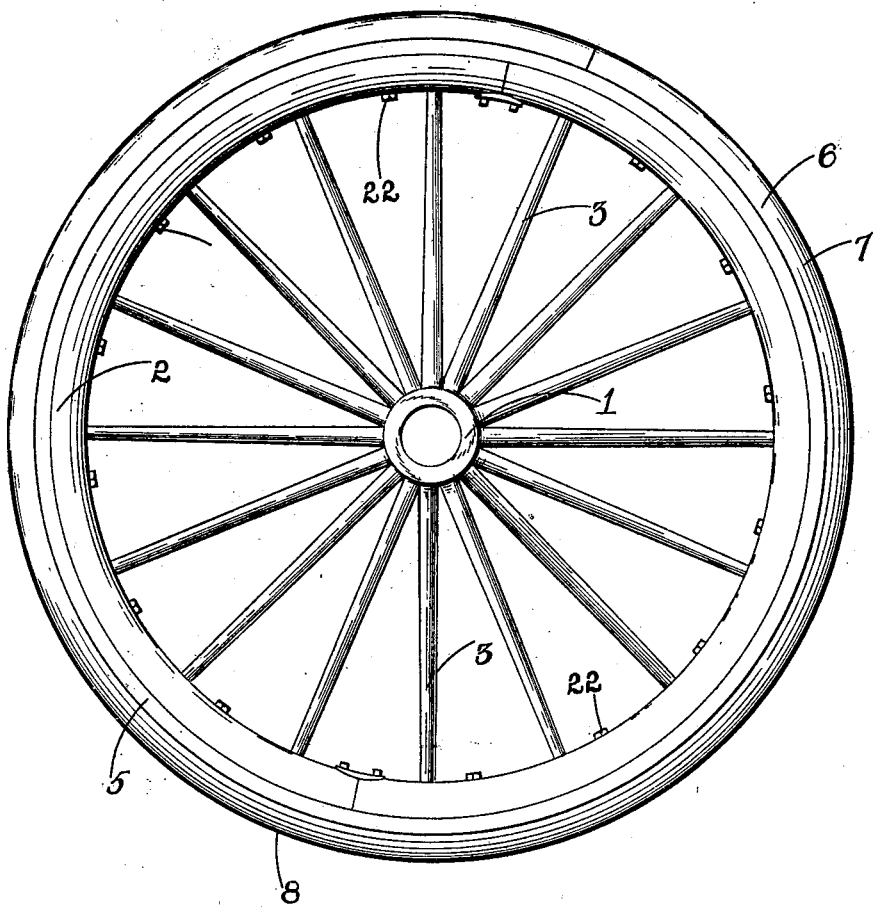
Figure 2:
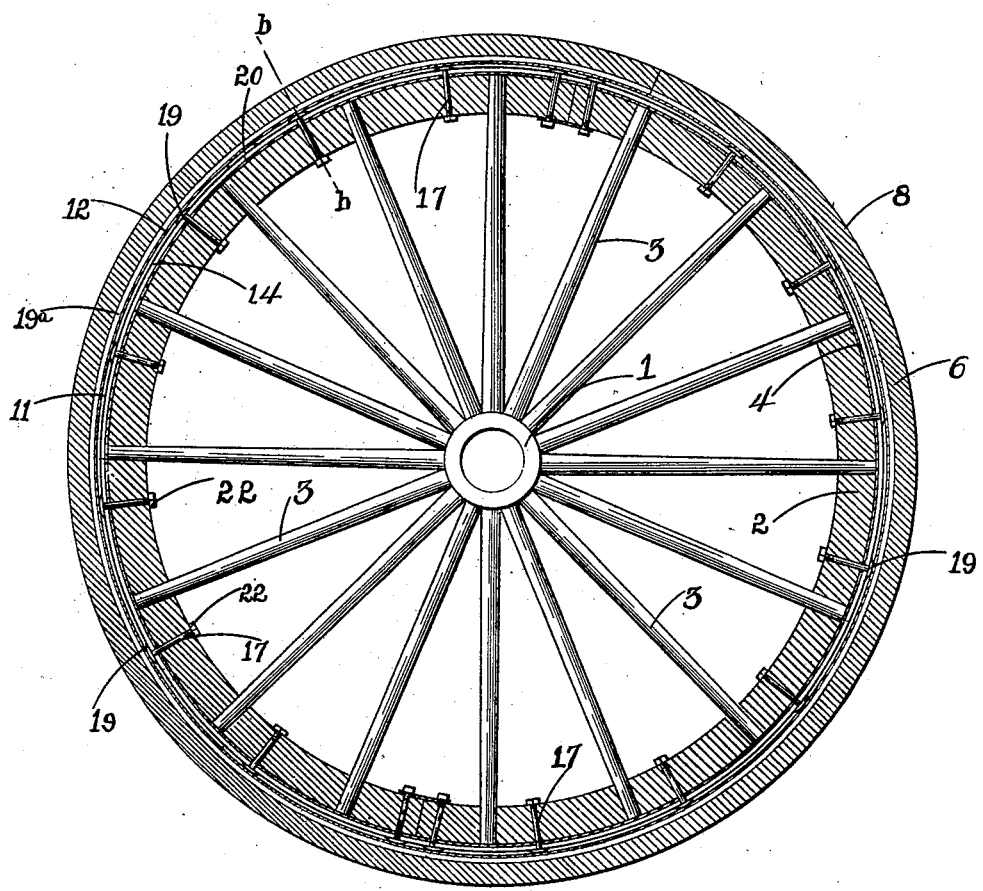

Figure 1 is a side elevation of a vehicle-wheel having my improved tire applied thereto. Fig. 2 is a central longitudinal section through the same on or about line $a\,a$, Fig. 3. Fig. 3 is an enlarged transverse section on or about line $b\,b$, Fig. 2, with the tire and locking device drawn rigidly upon the rim and showing the air-compartment between the dome of the opening in the tire and the locking device. Fig. 4 is an enlarged transverse section on or about line $b\,b$, Fig. 2, with the tire and locking device loosely fitted upon the rim preparatory to drawing them firmly into place. Fig. 5 is a perspective view of a section of the elastic tire and locking device. Fig. 6 is a perspective view of a portion of the felly and the metal rim, also showing one of the bolt-holes through the same. Fig. 7 is a perspective view of the preferred form of the piece of metal employed to fasten the ends of the locking device. Fig. 8 is a perspective view of a portion of the locking device. Fig. 9 is a top view of one of the preferred forms of bolts employed to fasten the locking device and rim and felly together. Fig. 10 is a section on or about line $c\,c$, Fig. 12. Fig. 11 is a detached side elevation of one of the preferred forms of bolts. Fig. 12 is a central longitudinal section through a portion of the locking device, showing the ends abutting and the piece of metal employed to fasten them together in place, also showing in dotted lines the screws which fasten the piece of metal to the locking device. Fig. 13 is a side elevation of a modified form of bolt having an elongated head adapted to be used in lieu of the piece of metal employed to fasten the ends of the locking device together. Fig. 14 is a top view of a portion of the locking device, illustrating the exterior of the joint.

The wheel is preferably constructed in the usual form, (shown in the drawings,) having a hub 1, felly 2, and a series of connecting-spokes 3, which radiate from the hub to the felly. A rim 4, formed of any suitable metal, is superimposed upon the felly and is provided with side flanges 5, thus making a channeled rim.

The tire 6 is formed of any suitable elastic material, such as rubber, and preferably in the shape in cross-section shown in Figs. 3 and 4, the upper sides 7 extending diagonally upward in approximately-straight lines and converging gradually toward each other and terminating in a curved top 8. The lower part of the tire is shaped to fit the channel in the rim 4, and a depression or groove 9 extends centrally longitudinally in the lower surface of said tire and terminates in an enlarged chamber 10. The tire is fastened to the rim by a locking device which encircles and is supported upon the rim, and the rim and locking device are in turn preferably fastened to the felly of the wheel by bolts that pass through the felly and rim and are fastened to the locking device. The preferred form of this locking device is shown in Figs. 3 and 8 and consists of a strip of thin metal 11—such as soft spring-steel, spring-brass, &c.—bent into the form shown in those figures, the upper portion having a curved top 12, conforming in shape to the curved top wall of the chamber 10 in the tire, and the lower edges of both sides of said curved top bending inwardly to form the clenching portions 13, which in turn bend downward to form the lower vertical supporting portions 14. The peculiar form of the locking device and the comparative thinness of the metal of which it is composed provide an interior chamber 15 of approximately the shape of the chamber 10 in the tire, but of smaller area, which terminates in a lower slot 16 of reduced size. The chamber 15 is shaped to receive the heads of the locking-bolts 17, the horizontal portion 13 forming ledges or shoulders upon which the lower surfaces of the bolt-heads rest, and the spaces or slot 16 between the portions 14 is of sufficient width to receive the upper portions 18 of the stems of the bolts. (See Fig. 3.) These bolts are preferably formed so that they are unrotatably supported in the chamber in the locking device, and the upper portion 18 of the stem of each bolt is flattened to give it an elongated or rectangular shape in cross-section of a size to fit the slot 16, said upper portion having straight flat sides and merging at the top in the head 19, which is also of an elongated shape and in cross-section substantially the form of the chamber 15 in the locking device. By forming the upper stem portions of the bolts thin in cross-section and wide in the opposite direction the full strength of the bolts is retained and they are prevented from rotating. The perpendicular longitudinal groove in the locking device may thereby be made narrower, leaving the lower surface of the tire wider between the sides of the groove and the side walls of the channeled rim, thus forming a wider base and a firmer support for the tire in the channeled rim, which is very essential where a narrow tire of the style shown in the drawings is used.

The lower vertical supporting portions 14 of the locking device are preferably made shorter and of less depth than the sides of the groove 9 in the tire 6 for a purpose which will be more fully explained hereinafter.

The clenching portions 13 preferably extend inward and upward, so that when the wheel is assembled they will clench the interposed portions of the tire between their under surface and the channeled rim and form a dovetail lock.

The ends of the locking device are preferably secured together by inserting a piece of metal 20 a short distance into the chamber at each end and fastening it in place with screws 21 or similar means, the ends being brought close together and the screws set flush, or nearly so, with the surface of the locking device, thereby forming an annular locking device of the same exterior size, shape, and form at all points.

The operation of applying my invention is preferably as follows: The metal channeled rim 4 is superimposed upon the felly 2 of the wheel in the usual well-known manner, and holes 23 for bolts are drilled through the rim and the felly at suitable distances apart, as shown in Figs. 2, 3, 4, and 6. The length of the locking device necessary to encircle the wheel in the channel of the rim 4 is determined by measuring the circumference of the rim at the bottom of the channel, and the locking device is cut to a corresponding length, and a sufficient number of bolts 17 are slipped longitudinally through the groove 14 and chamber 15 of the locking device to correspond with the number of holes in the rim and felly of the wheel. (Shown in Figs. 1 and 2.) A metal strip 20 of the same shape in cross-section as the chamber 15 in the locking device and having pin-holes near each end with screw-threads cut in them is inserted longitudinally into said chamber 15 and secured therein by screw-pins 21 or similar means. The tire 6 is left enough longer than the locking device and the circumference of the wheel in the channel of the rim 4 to allow for a sufficient longitudinal compression of the rubber or other elastic material of which the tire is made. The locking device is pushed longitudinally into the chamber 10 and groove 9 of the tire until the end having the metal strip 20 secured thereto projects a short distance from the end of the tire. A clamp is rigidly attached to this end of the locking device, against which the end of the tire abuts, to prevent end movement of the tire at this end. The other end of the locking device, which is within the tire some distance from the end, is gripped and firmly held through the groove 9 and chamber 10 by a suitable instrument, and the tire is crowded back toward the rigidly-secured clamp at the opposite end until this end of the locking device projects a short distance from that end of the tire, where it is rigidly clamped to prevent end movement. The tire is then bent around the wheel in the channel of the rim, and the several bolts are entered into their corresponding holes and passed through the rim and felly, and the tire is drawn to its place in the channeled rim by nuts 22. As the tire is drawn to its place the ends of the locking device approach each other, and the metal strip 20, which has been secured to one end of the locking device, is slipped longitudinally into the chamber 15 of the opposite end of the locking device, and when the tire is fully in place the ends of the locking device will come close together, and the end is secured by the screw-pins 21 in the same manner as at the other end, thus firmly uniting the ends and making the locking device continuous around the wheel. The clamps at each end of the locking device are then removed, and the end pressure being taken from the tire it comes to a butt-joint readily, owing to its longitudinally-compressed condition.

It will be observed that during the operation of drawing the tire to its place by the bolts 17 the locking device, having the vertical parts 14 of slightly-less depth than the sides of the groove 9 in the tire, is drawn down until the lower edges of the parts 14 will rest and be supported upon the rim, and at the same time the portions of the tire interposed between the parts 13 of the locking device and the metal rim are compressed, thus clenching and firmly holding the tire at its lower surface at all points around the wheel and effectually preventing what is known as "creeping" or sliding of the tire in the metal channeled rim, which is a serious objection to tires of this class as at present constructed. It will also be observed by referring to Figs. 3 and 4 that in drawing down the locking device in the manner described a longitudinal space has been formed between the chamber of the tire and the locking device, as shown at 19ª in Fig. 3. This space provides an air compartment or cushion, thereby giving greater elasticity to the wheel when in operation.

While I prefer the construction and method described herein for assembling and putting together the parts, I desire it to be understood that I do not wish to be confined to this particular method, as my improved tire admits of being put on and secured to the wheel in several different ways—as, for instance, the metal strip which joins the ends of the locking device may only be secured to one end of the locking device, and by longitudinally slipping the metal strip into the opposite end without fastening it thereto it will make a good serviceable joint. In this case the joined ends of the locking device would be held against vertical, lateral, or horizontal movement, which would be sufficient, or the metal strip may be dispensed with entirely and the ends of the locking device may be secured against vertical, lateral, or horizontal movement by a bolt having a head 24 of modified form, (see Fig. 13,) which may, if desired, be fastened to the locking device by screws in a manner similar to the metal strip 20, as shown in Fig. 10, and in some cases this last-named method may be preferable.

The principal advantages of my invention are that the locking device is comparatively large in size, that it forms a metal lining or reinforcement for the opening in the tire, that while it is almost wholly within the tire it is supported at all points upon the wheel by its lower edges resting upon the periphery of the wheel-rim, thus preventing any tendency of the locking device tearing or cutting the tire. The tire is secured in place by an interior fastening which clenches interposed interior portions between itself and the metal rim of the wheel, the sides being free to move to a limited degree under pressure during the operation of the wheel, which materially prevents the chafing or cutting of the sides. The locking device is entirely concealed when the wheel is assembled, and owing to the longitudinal space above the locking device, which acts as a cushion and gives slightly under pressure, the elasticity and durability of the tire are greatly increased.

I claim as my invention—

1. In a vehicle-wheel, an elastic tire having a groove and chamber open from the lower surface throughout its length, a locking device fitting in said groove and chamber; said locking device having a groove and chamber for the reception of locking-bolts for securing the tire to the wheel and having its lower edge resting upon the rim of the wheel.

2. A vehicle-wheel having a rim, a longitudinal locking device encircling and resting upon the rim, an elastic tire having a longitudinal groove and chamber open from the lower surface thereof for receiving the locking device; the locking device being formed with its sides extending inward and upward and downward into contact with the rim for clenching and pressing the lower portions of the tire against the rim and having a groove extending from the rim and terminating in a chamber, and bolts seated in the groove and chamber in the locking device for securing the tire to the wheel.

3. A wheel for vehicles and the like, having a rim, an elastic tire and a locking device encircling said rim, with its lower edge in contact with and supported upon the rim and having a locking portion extending into the interior of the tire.

4. A wheel for vehicles and the like, having a felly, a channeled rim superimposed upon said felly, a tire superimposed upon said rim and having an interior longitudinally-extending chamber, a locking device shaped to conform to the chamber and having an interior longitudinally-extending chamber, and bolts passed through the felly and having their heads seating in the chamber in the locking device and adapted to clench portions of the tire between the locking device and the rim and also draw the lower edge of the locking device in contact with the rim.

5. A wheel for vehicles and the like, having a felly, a rim superimposed upon said felly, bolts passed through said rim and felly, a tire superimposed upon the rim, and a locking device formed of thin material open on its lower surface throughout its length and having its interior shaped to form a locking-seat for the heads and a portion of the stems of the bolts, the lower portion of said locking device resting upon the rim of the wheel.

6. A wheel for vehicles and the like, having a felly, a rim superimposed upon said felly, bolts passed through said rim and felly, a tire superimposed upon the rim and having a central longitudinally-extending locking-chamber, and a longitudinal groove extending from said chamber through the lower surface of the tire, and a locking device formed of thin material and shaped exteriorly to approximately conform to the form of the locking-chamber in the tire and interiorly to conform to and form a locking-seat for the heads of the bolts and having its lower edges in contact with the rim at all points.

7. The combination with the felly of a wheel, of a tire superimposed thereon and having a central longitudinal depression, bolts having their heads extending into said depression, and an annular strip of thin material encircling the felly shaped to conform to the depression in the tire and the heads of the bolts, and interposed between the heads of the bolts and the interior of the depression and having its lower edges in contact at all points with the felly.

8. The combination with a wheel, of a tire superimposed thereon and having a central longitudinal depression, bolts having their heads extending into said depression and an annular strip of thin material encircling the periphery of the wheel shaped to conform to the depression in the tire and the heads of the bolts, and interposed between the heads of the bolts and the interior of the depression, and having portions extending into contact with the periphery of the wheel for supporting the heads of the bolts above said wheel-periphery.

9. The combination with the rim of a wheel, of a tire superimposed thereon and having a central longitudinal depression in the lower surface thereof, bolts having their heads extending into said depression and an annular strip of thin material encircling the rim shaped to conform to the depression in the tire and the heads of the bolts, and interposed between the heads of the bolts and the interior of the depression, and having portions for supporting the heads of the bolts above the rim; the lower edges of which are in contact at all points with said rim.

10. A wheel for vehicles and the like, having a rim, an elastic tire and a chambered locking device encircling said rim with its lower edge in contact therewith and having a locking portion extending from the rim into the interior of the tire, and means within the chamber for securing the ends of the locking device together.

11. The combination with the rim of a wheel, of a tire superimposed thereon and having a central longitudinal depression extending outwardly from the rim, bolts having their heads extending into said depression, and an annular strip of thin material encircling the rim with its lower edge resting on said rim and interposed between the heads and upper portions of the stems of the bolts and the interior of the depression, and means for securing the abutting ends of said strip together.

12. A wheel for vehicles and the like, having a felly, a rim superimposed upon said felly, bolts passed through said rim and felly, a tire superimposed upon the rim, a locking device formed of thin material and having its interior shaped to form a locking-seat for the heads of the bolts; said locking device encircling the rim and having its lower edge in contact with said rim.

13. A wheel for vehicles and the like, having a felly, a rim superimposed upon said felly, bolts passed through said rim and felly, a tire superimposed upon the rim, and having a central longitudinally-extending locking-chamber, and a groove extending from said chamber through the lower surface of the tire, a locking device formed of a strip of thin material and shaped exteriorly to approximately conform to the form of the locking-chamber in the tire, and interiorly to conform to and form a locking-seat for the heads of the bolts; said locking device encircling and resting on the rim, and means for securing the abutting ends of said fastening device together.

14. A wheel for vehicles and the like, having a felly, a rim superimposed upon said felly, bolts passed through said rim and felly, and having flattened upper stem portions and elongated heads, a tire superimposed upon the rim, and a locking device having an upper interior chamber to receive the elongated heads of the bolts, and a lower groove to receive the flattened upper portions of said bolts and having the lower edges of the side walls of the groove in contact with the rim.

15. A vehicle-wheel having a rim, an elastic tire having a longitudinally-extending groove with vertical sides open from the lower surface thereof, and terminating in an enlarged longitudinally-extending chamber, a longitudinally-extending locking device fitting in and encircling the groove and chamber in the tire; and having vertical portions of less depth than the vertical sides of the groove in the tire, to admit of the locking device being drawn down by the rim for the purpose of compressing and holding the tire between the locking device and the rim of the wheel, the lower edges of the vertical portions coming in contact with the rim and thereby limiting the compression.

16. A wheel for vehicles and the like, having a rim, a tire superimposed upon the rim, and having a longitudinal depression upon its lower surface terminating in an upper enlarged longitudinal chamber, a locking device having its upper portion in the chamber and its lower portion in the depression and shorter in length than the side wall of the depression, and means for drawing the lower edge of the locking portion in contact with the rim, and thereby clenching the two in position and forming an air-compartment between the locking device and the interior of the tire.

RICHARD MULHOLLAND.

Witnesses:
A. J. SANGSTER,
L. M. BILLINGS.